July 19, 1938. E. G. McCAULEY Re. 20,803

PNEUMATIC BRAKE

Original Filed Feb. 27, 1929 3 Sheets-Sheet 1

INVENTOR
ERNEST G. McCAULEY
BY Robert V. Laughlin and Wade Crouch
ATTORNEYS

July 19, 1938. E. G. McCAULEY Re. 20,803

PNEUMATIC BRAKE

Original Filed Feb. 27, 1929 3 Sheets-Sheet 2

INVENTOR
ERNEST G. McCAULEY
BY Robert V. Langhlin and Wade Toomey
ATTORNEYS

PNEUMATIC BRAKE

Original Filed Feb. 27, 1929 3 Sheets-Sheet 3

INVENTOR
ERNEST G. McCAULEY
BY Robert V. Laughlin and Wade Koontz
ATTORNEYS

Reissued July 19, 1938 Re. 20,803

UNITED STATES PATENT OFFICE 20,803

PNEUMATIC BRAKE

Ernest G. McCauley, Dayton, Ohio

Original No. 2,007,500, dated July 9, 1935, Serial No. 343,138, February 27, 1929. Application for reissue March 24, 1936, Serial No. 70,593

20 Claims. (Cl. 303—6)

The invention described herein may be manufactured and used by or for the Government for governmental purposes, without the payment to me of any royalty thereon.

This invention relates generally to fluid pressure control systems and is herein particularly concerned with a fluid pressure control system capable of adaptation on the brakes of a moving vehicle and more particularly to an airplane whereby the forward motion of the said vehicle can be controlled.

It is a well-known fact that a pilot of an airplane is practically helpless in taxiing an airplane about a flying field, especially over rough or marshy ground. In the case of a marshy field the weight of the airplane has a tendency to sink the wheels in the ground, which together with the added drag of the tail skid practically prohibits maneuverability. By the adaptation of such a system as described in the present invention, a pilot is enabled to maneuver his plane in any direction desired by the mere application of either the right or left brake, the tendency being for the plane to pivot about the braked wheel.

In the case of a flying field having a drainage system for carrying off the water, the ground being practically hard on the surface, there is little or no resistance offered the plane prior to take-off or landing, the result being that in many instances a pilot in attempting to make a landing is forced to take to the air again due to his inability to bring his plane to a stop soon enough to prevent its crashing into buildings or other obstructions on the flying field. The use of a system such as herein described permits of the plane being brought to a quick stop thereby avoiding the necessity of an emergency take-off to prevent crashing into such obstructions.

One of the principal objects of the present invention is to provide brakes for the landing wheels of an airplane incorporating a fluid pressure system for controlling the operation of the said brakes.

Another object of the invention is the provision of a fluid pressure controlled brake system whereby the landing wheels may be locked against further movement in a forward direction. This is especially desirable when starting an airplane wherein it is necessary to use blocks to prevent the plane from rolling forward when the engine is started. Thus, in the case of an emergency landing, the pilot is not only enabled to bring his plane to a stop in a short space; but having brought the plane to a standstill he is enabled to start the engine himself without assistance, by locking the wheels, thus eliminating the hazard of being run down by the plane.

A further object of the invention is the provision of a control valve for controlling the system heretofore mentioned, whereby the brakes may be selectively applied, either individually or simultaneously together, which permits of the maneuvering of the airplane as the pilot so desires.

A further characteristic of the invention is the provision of a braking mechanism of novel construction which operates in connection with the fluid pressure control system wherein simplicity and more effective braking with longer wear to the working parts are inherent in its construction.

The invention is illustrated in the accompanying drawings in which.

The same, or similar reference numerals are applied to parts throughout the drawings.

Figure 1:
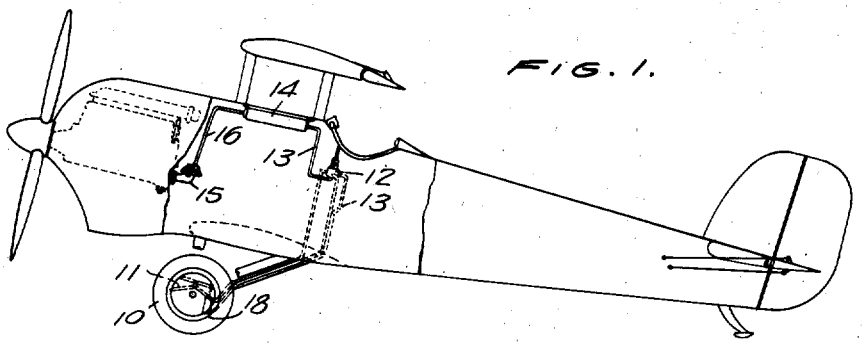
Fig. 1 is a diagrammatic view of the fluid pressure control system of my invention.

The fluid pressure control system of the present invention is shown applied to the wheels 10 of an airplane having brake mechanisms 11 mounted thereon which are provided to control the rolling effect of the airplane either in taking off or in landing.

The system to be hereinafter described comprises essentially three main units: the brake mechanism 11 as attached to the wheels, a selective control valve 12 for controlling the operation of the brake mechanism 11, and the piping system 13 interconnecting the control valve 12 and brake mechanism 11. The piping system 13 is adapted to receive fluid under pressure from a tank 14 conveniently located within the fuselage of the airplane. The tank 14 is connected to a compressor 15 through pipe line 16, the said compressor being operated by the power plant of the airplane by any suitable power transmitting means. Any suitable pressure transmitting medium may be adapted to the present system. However, for the purpose of best illustrating the present invention the system will be herein described as using air as a power transmitting medium due to its light weight, this fact being especially important as concerns its use in a control system for aircraft.

Figure 3:
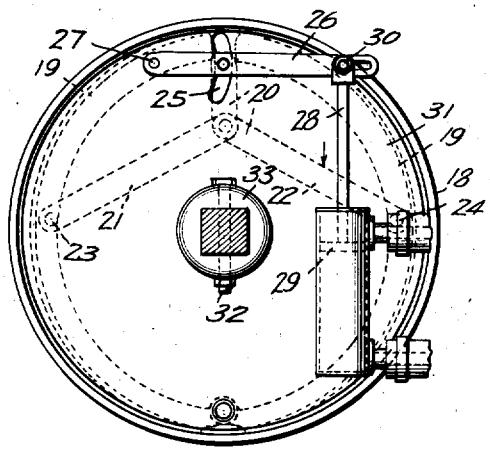
Fig. 3 is a plan view of the brake mechanism shown in Fig. 2.
Figure 2:
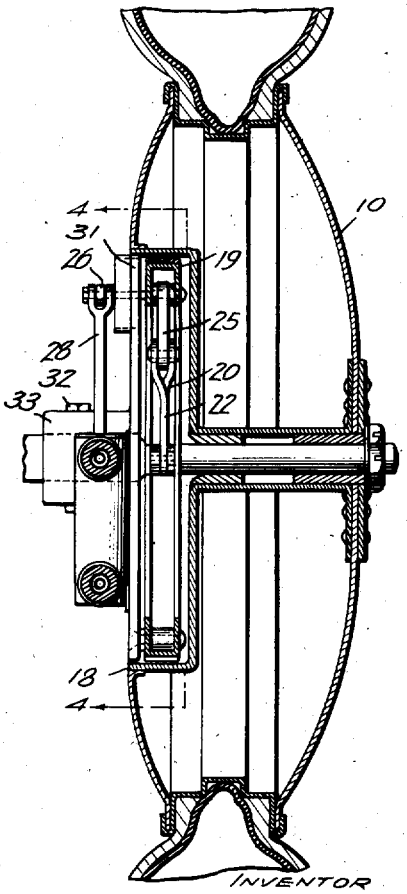
Fig. 2 is an enlarged sectional view of the brake mechanism.
Figure 4:
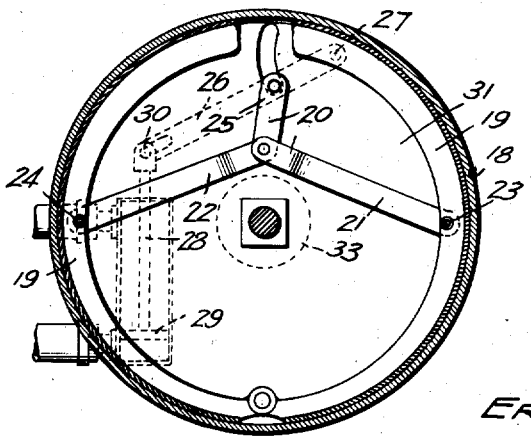
Fig. 4 is a section being taken on line 4—4 of Fig. 2.
Figure 5:
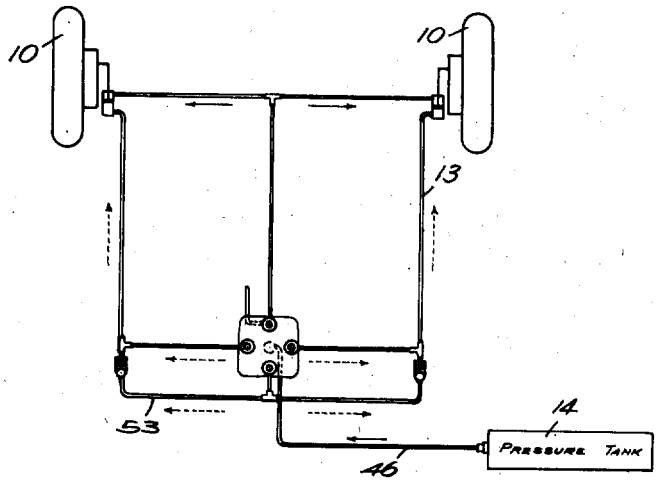
Fig. 5 is a diagrammatic view of the fluid pressure control system as applied to the wheel brakes of an airplane.

Referring to Fig. 1, the airplane is shown as being provided with landing wheels 10. Secured to the wheels 10 is a brake drum 18 within which is mounted an expandible brake member 19 adapted to be expanded so as to frictionally engage the brake drum. To this end a toggle joint linkage generally designated by numeral 20 is provided, which comprises a series of links 21 and 22 pivotally connected as at 23 and 24 to the brake member 19. These links are in turn pivotally connected to a third link member 25 which is connected to an arm 26, movement of which imparts motion to the toggle joint 20 in the manner shown in Fig. 4 to expand the brake member 19. The arm 26 for controlling the operation of the brake member 19 is pivotally connected to the brake drum 18 at its one end by pin 27, the other end of the said arm being pivotally connected to the rod 28 of an operating piston 29 by any suitable means, here shown as comprising a pin 30 passing through the end of the arm 26 and rod 28 respectively. It will be apparent from the description thus far and by references to Figs. 3 and 4 of the drawings that as the piston is moved from the position shown in Fig. 3 to the position shown in Fig. 4, motion is imparted to the toggle joint 20 in such a manner as to expand the brake member 19 to frictionally engage the drum 18. The links 21 and 22 are connected to the expandible brake member 19 at points lying along a horizontal plane passing through the axis of rotation of the brake drum.

A drum cover plate 31 is secured to the axle of the landing wheels in any convenient manner, in this instance, a bolt 32 being provided, which passes through the cylindrical portion 33 integral with the drum cover plate and the axle of the landing wheels respectively.

This type of improved brake mechanism presents advantages which are particularly adaptable to a system embodied in the present invention in that the pressure is applied at the center of each expanding member and in consequence thereof the braking pressure is more evenly distributed around the brake drum with a consequent saving in wear and tear to the elements comprising the complete brake assembly.

For controlling the operation of the brakes 11, a manually operated master control valve unit is provided. This control valve comprises a casing 34 in which are arranged a series of cylinders 35 for receiving piston type valve 36 therein, the operation of which controls the admission of fluid pressure to the brake mechanism as heretofore mentioned.

The valves 36 are provided with stems 37 at their outer extremities which are slidable in bearing portions 38 located in removable bushings 39. The bushings are shown as being provided with suitable means as at 40 constituting a leakproof joint whereby the escape of the pressure fluid is prevented at these points. The valves 36 are hollowed out, as shown at 41, to receive coiled springs 42 therein, said springs being mounted within the casing under compression. One end of the said springs bear against the ends of the hollowed out portions 41, the other ends bearing against removable plugs 43 which are provided for the purpose of allowing the entire valve unit to be assembled or disassembled for the purpose of removing worn parts or cleaning the valve unit of any possible sediment which lodges therein after a period of time.

The control unit is provided with a pressure chamber 44 which communicates directly with the valves 36 through the medium of valve seats 45. The pressure chamber is connected to the pressure tank 14 through pipe 46 and fitting, the said pipe 46 being free of restriction such as check valves or the like to insure of the pressure in the tank being transmitted directly to the pressure chamber in the valve unit in an unrestricted manner.

The valves 36 are provided with relieved portions 47, the space between said portions and cylinder walls providing a passageway for the return of the pressure fluid when the valves are not in operation; the function of which will be hereinafter described.

A control handle 42 is provided on the control valve unit having a ball 48 mounted at its lower end which engages in a suitable socket piece 49 connected to the casing 34. A plate 50 is fixedly mounted on the control handle and so positioned as to be immediately above the ends of the valve stems 37. It will be thus apparent that any desired valve may be operated by moving the control handle in the direction of any one of the arrows shown in Fig. 6. It is desired that when not in use the control handle shall return to a neutral position, and to this end, a spring 51 is provided which is centrally mounted between the socket piece 49 and grooves 52 provided in the plate 50 to hold the handle in a vertical position, said spring being under compression when once mounted in its position irrespective of the positioning of the control handle.

Suitable ports are provided in the valve casing interconnecting a system of piping and the brake mechanism heretofore described to transmit the fluid pressure to the brake mechanism and simultaneously apply the brakes. For the purpose of illustration, these ports will hereinafter be indicated by letter of reference, viz.: F designates the port controlling the transmission of fluid to the right wheel, E designates the port controlling the left wheel, D designates the port controlling the operation of both wheels simultaneously, B designates the port for relieving the pressure at all brakes, G designates the exhaust port, and H designates the pressure inlet or intake port.

Figure 10:
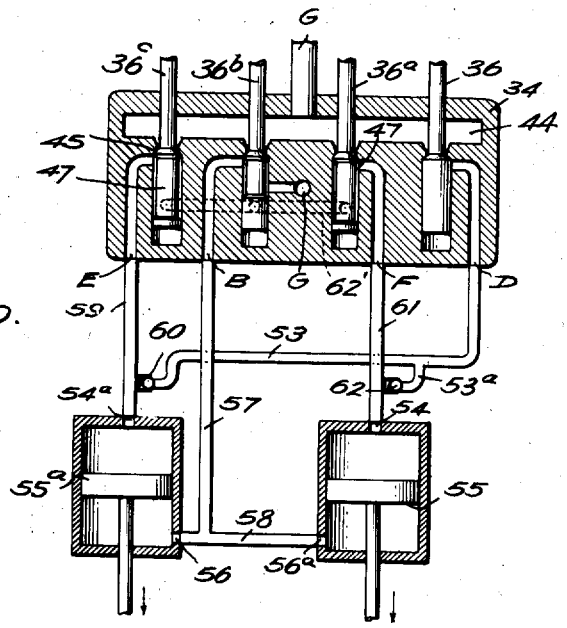
Fig. 10 is a layout view of the valve mechanism wherein the operation relative to the entire system is illustrated.

If, while the airplane is taxiing straight ahead or substantially so, it is desired to apply the brakes to both wheels simultaneously, the control handle 32 is moved in the direction of arrow J. In this position the valve 36 is opened and fluid under pressure passes through port D to pipes 53 and 53a and thence to the working chambers of the pressure cylinders 55 and 55a respectively provided on the rear side of the pistons 29 heretofore mentioned. Under the pressure of the fluid thus supplied, these pistons are moved in the direction of the arrows as in Figs. 3 and 10 to apply the brakes. It will thus be seen that in this position the full force of the pressure fluid is supplied equally and at the same rate to all brakes.

At the same time that fluid is supplied to the one end of the cylinder behind the piston to move the latter and apply the brakes, fluid from in front of the pistons is permitted to escape from the cylinder through exhaust ports 56 and 56a, flows through pipes 57 and 58, entering port B in master control unit 12 where it passes around the relieved portions 47 and escapes through pressure outlet G.

Figure 6:
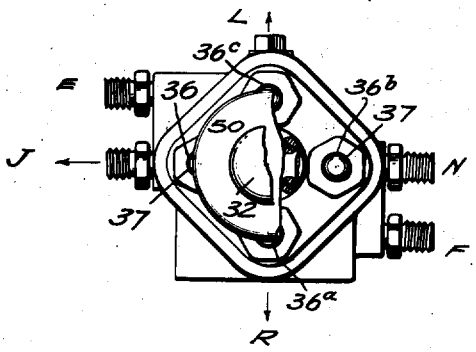
Fig. 6 is a top plan view of the valve control mechanism for controlling the system.
Figure 8:
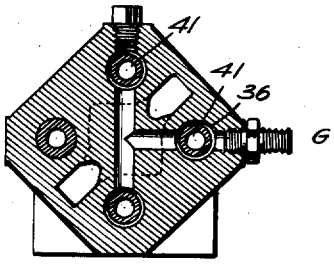
Fig. 8 is a sectional view taken on the line 8—8 of Fig. 7.
Figure 7:
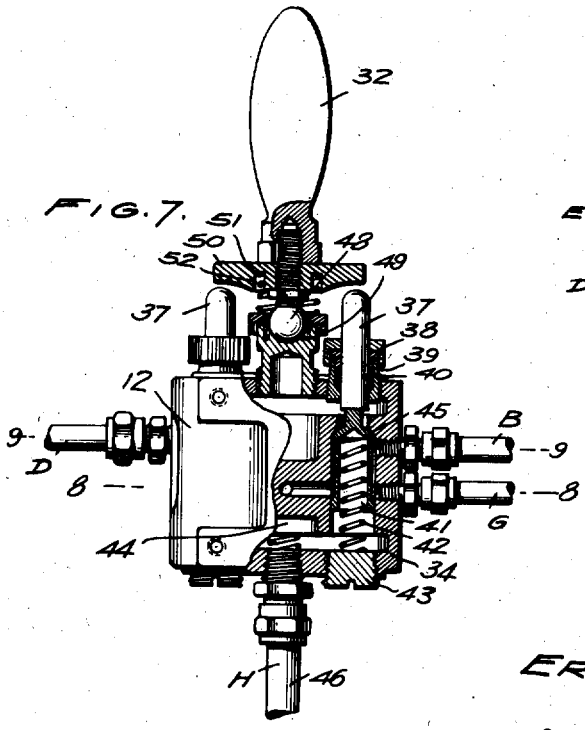
Fig. 7 is a side view partially in section of the valve shown in Fig. 6.
Figure 9:
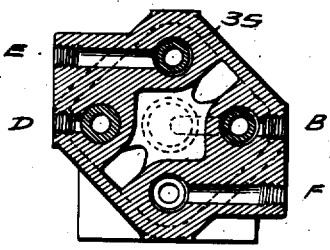
Fig. 9 is a sectional view taken on the line 9—9 of Fig. 7.

If it is desired to apply the left brake, the control handle 32 is moved in the direction of the arrow L shown in Fig. 6.

In this position the valve 36c is opened and fluid under pressure is transmitted through port E to pipe 59 and flows into intake port 54a of pressure cylinder 55a to apply the left brake. A ball check valve 60 is provided in pipe line 53 at the junction formed by pipes 53 and 59 respectively in order to prevent pressure fluid from entering the opposite brake cylinder. Pressure fluid from in front of the piston escapes from the cylinder in the same manner as is the case where both brakes are applied.

In a similar manner, should it be desired to apply the right brake, the control handle is moved in the direction of the arrow R shown in Fig. 6.

When in this position, the valve 36a is opened and fluid under pressure is transmitted through port F to pipe 61, and flows into intake port 54 of pressure cylinder 55 to apply the right brake. A ball check valve 62 is mounted in pipe 61 at the junction formed by pipes 53a and 61 respectively in order to prevent pressure fluid from entering the left brake. Fluid from in front of the piston is permitted to escape in the manner heretofore described.

The pressure fluid admitted to the rear of the piston for applying the left brake is trapped by setting valve 45 through the action of spring 42 and the closing of a passage 62' by the valve 36b, through which communication may be established between the pipe 59 and the pressure outlet port G. The pressure fluid admitted to the rear of the piston for applying the right brake will be trapped in like manner by the setting of the valve 36a through the action of its corresponding spring 42. It will be obvious from an inspection of Fig. 10 that the pressure fluid admitted to the rear side of the pistons whether admitted through ports D, E, or F, will remain trapped as long as the valves corresponding to those ports are respectively seated together with the setting of 36b.

It is to be understood that when either the right or left brakes are applied, the valve 36b will, in all cases, be closed to permit the escaping fluid to by-pass around relieved portion 47 of that valve whereby to permit of its escape through outlet G.

When it is desired to release the brakes, the control handle is moved in the direction of the arrow N shown in Fig. 6. In this position the valve 36b is opened and fluid under pressure is transmitted through port B, passes through pipes 57 and 58, and enters cylinders 55 and 55a to release the brakes. Fluid from in back of the pistons escapes through pipes 59 and 61, enters ports E and F respectively, and passes thereafter through relieved portion 47 of valves 36c and 36a. Passages 62' are provided, interconnecting valves 36c and 36a and the pressure outlet port G through which the pressure fluid is permitted to escape.

As heretofore mentioned, the control handle 32 is formed with a ball 48 at its lower end which engages in a suitable socket piece 49 connected to the casing 34. By arranging the control handle in this manner it will be obvious that in moving the control handle at an angle of 45°, it is possible to actuate one or more sets of valves in a predetermined manner and thereby control a positive actuation of one or more of said brakes into operative or inoperative positions in preselected combinations. For example, let it be assumed that the control valve 36 is actuated so that the fluid pressure in the supply chamber 44 may be utilized to simultaneously apply both brakes by transmitting the same to the pistons 55a and 55 through the medium of the lines 53 and 53a respectively. Under these conditions should it be desired to maintain the piston in the cylinder 55a in a locked position and release the piston in the cylinder 55, this may be accomplished by moving the control handle angularly 45° in order to simultaneously open the valves 36c and 36b. In so doing it will be apparent that in simultaneously opening these valves the fluid pressure in the chamber 44 is transmitted to the one side of the piston in the cylinder 55a and simultaneously is applied to the other side of the piston in the cylinder 55a through the medium of the lines 59 and 57. Since the pressure of the fluid entering the piston 55a to both sides of the piston therein is equalized, it will be apparent that no movement in either direction will be imparted the piston in that cylinder. Consequently the pressure of the fluid in the line 57 will be transmitted to the piston in the cylinder 55 and release the same. This by reason of the fact that the fluid on the other side of the piston in the cylinder 55 is transmitted through the line 61 through the by-pass 47 and thereafter through the by-pass line 62' and consequently is exhausted through the port G by reason of the fact that during this time the valve 36b is in the down position. Consequently the piston in the cylinder 55a will be retained in the operated position and the piston in the cylinder 55 will be actuated into an inoperative position.

On the other hand should it be desired to release the piston in the cylinder 55a and retain the piston in the cylinder 55 in an operated position, this same may be accomplished by moving the control handle to simultaneously actuate the valves 36b and 36a. In so doing the fluid pressure in simultaneously entering the piston 55 through the ports 54 and 56a will be balanced and the fluid pressure will be by-passed through the port 56 in the cylinder 55a to effect a release of the piston in this cylinder.

To provide positive means for insuring the closing of the valves when not in use, it is intended that the spring 42 when assembled in the control unit shall exert a greater pressure against the valve than the pressure of the fluid in the system.

For example, let it be assumed that the fluid pressure is maintained at 100 lbs. pressure. In this instance, it is intended that the force exerted against the valves by the spring 42 shall be 105 lbs. pressure. It will be thus apparent that the valve will be closed immediately upon the release of the control handle.

I have described my invention as being applicable to the wheels of an airplane. However, I do not intend to be understood as limiting myself thereto, as I contemplate changes in form, the proportion of parts and the substitution of equivalents, as circumstances may suggest or render expedient without departing from the spirit of the invention.

What I claim is:

1. In a brake system for aircraft having landing wheels, fluid pressure actuated brake mechanisms for each of said wheels, and a fluid pressure control comprising means for selectively controlling the transmission of said fluid pressure to each of said brake mechanisms for causing the actuation thereof by said fluid pressure into operative or inoperative position.

2. In a brake system for aircraft having landing wheels, fluid pressure actuated brake mechanisms for each of said wheels, and a fluid pressure control comprising means for selectively controlling the transmission of said fluid pressure to each of said brake mechanisms for causing the actuation thereof by said fluid pressure into operative or inoperative position either separately or in combination.

3. In a brake system for an aircraft having landing wheels, a plurality of members having movable parts, piston means connected therewith, cylinders having said pistons operating therein, a source of fluid pressure supply and means for selectively admitting fluid pressure from said source to any one of said cylinders for actuating said pistons in one direction and fluid pressure control means for actuating any one of said preselected actuated pistons in the opposite direction.

4. In a brake system for an aircraft having landing wheels, a brake drum member mounted on each of said wheels and adapted to rotate therewith, a brake mechanism cooperating with each brake drum, said brake mechanism comprising an expandible member adapted to frictionally engage said brake drum, a fluid pressure actuated device, and linkage interconnecting said device and expandible member, a source of fluid pressure supply and control means to selectively admit fluid pressure from said source to each of said devices to actuate said brake mechanism into operative position and fluid pressure control means for releasing said brake mechanisms.

5. In a motor vehicle brake system, in combination a source of fluid pressure supply adapted to deliver fluid pressure for operating said brakes, a brake operating mechanism for each of said brakes, a unitary control means adapted to selectively transmit said fluid pressure from said source to any one of said brake operating mechanisms and a system of pipe lines extending from said control means to each of said brake mechanisms, said control means being so constructed and arranged that said brake mechanisms may be actuated in operative or inoperative positions by fluid pressure either separately or in combination.

6. In a brake system for the landing wheels of an aircraft, in combination a source of fluid pressure supply adapted to deliver fluid pressure for operating said brakes, a piston type brake operating mechanism for each of said brakes, a manually operated unitary control device adapted to selectively control said fluid pressure from said source to said brake mechanisms and a system of pipe lines extending from said control device to each of said brake mechanisms, said control means being so constructed and arranged that said brake mechanisms may be positively actuated into operative or inoperative positions separately or in combination by fluid pressure.

7. In a unitary control device for use in connection with a plurality of fluid pressure operated brake mechanisms, selective means for controlling the transmission of fluid pressure to actuate said brake mechanism into operative position and separate means for controlling the transmission of fluid pressure to said brake mechanism to actuate the same into inoperative positions.

8. In a unitary control device for use in connection with a plurality of fluid pressure brake operating mechanisms, selective valve means for transmitting fluid pressure from said device to control the actuation of said brake mechanism into operative position and separate means for controlling transmission of fluid pressure to said brake mechanisms to actuate the same into inoperative positions, said valve means being so constructed and arranged as to trap said fluid pressure in said brake mechanism to thereby maintain said mechanism in an actuated position.

9. A unitary control device adapted for use in connection with a vehicle having fluid pressure operated brakes, comprising in combination a controlling selector adapted to be moved at will to different positions, a plurality of control valves adapted to be selectively controlled by said selector and transmission connections from said control valves to said fluid pressure operated brakes, said control valves being so constructed and arranged as to control the actuation of said brakes to maintain any one or more of said brakes in an actuated position.

10. A unitary control device adapted for use in connection with a vehicle having fluid pressure operated brakes, comprising in combination a controlling selector adapted to be moved at will to different positions for actuating any one or more of said brakes, a plurality of control valves adapted to be selectively controlled by said selector, and transmission connections from said control valves to said fluid pressure operated brakes, said control device being so constructed and arranged that movement of said controlling selector into a predetermined position serves to operate one of said control valves to control the positive actuation of said vehicle brakes in a preselected manner and to maintain the same in an actuated position.

11. A unitary control device adapted for use in connection with a vehicle having fluid pressure operated brakes, comprising in combination a controlling selector adapted to be moved at will to different positions, a plurality of control valves adapted to be selectively controlled by said selector, and transmission connections from said control valves to said fluid pressure operated brakes, said control device being so constructed and arranged that movement of said controlling selector into one position serves to operate one combination of said control valves to control the actuation of said brakes into operative position of one brake and the actuation into inoperative position of the other brake.

12. In a control system, a source of fluid pressure supply, a plurality of rotatable members, each member having fluid pressure actuated brake elements mounted thereon and a unitary control means for selectively controlling the transmission of said fluid pressure to said brake elements to actuate the same into operative position and including separate means for controlling the transmission of fluid pressure to said elements for actuating the same into inoperative position.

13. In a control system, a generated source of fluid pressure supply, a plurality of rotating members, each member having a brake mechanism, a brake drum supported by said rotating members and cooperating with said brake mechanism, a fluid pressure responsive device adapted to actuate said brake mechanism, means for selectively controlling the transmission of said fluid pressure to any one of said devices for actuating said brake mechanism into engagement with its respective brake drum for trapping said fluid pressure to thereby lock said brake mechanism in an actuated position thereof and separate means for controlling the transmission of fluid pressure to said brake mechanisms for actuating the same into inoperative position.

14. In a control system, a source of fluid pressure supply, a plurality of parts to be operated, each part having a pressure responsive element connected thereto, means for selectively controlling the transmission of said fluid pressure to said elements to actuate any one of said parts into operative position and separate means for controlling the transmission of fluid pressure to said elements for returning said operated parts into inoperative position.

15. In a control system, a source of fluid pressure supply, a plurality of rotatable members, each member having pressure responsive members mounted thereon, means for selectively controlling the transmission of said fluid pressure to said elements to actuate the same into operative position and thereby retard the rotation of any one of said members, and separate means for controlling the transmission of fluid pressure to said elements for releasing said elements from their retarding position.

16. In a brake control system, a source of fluid pressure supply, a plurality of rotatable members, a pressure responsive brake element for each member, means for selectively controlling the transmission of said fluid pressure to actuate any one of said pressure responsive elements into brake applying or releasing position and for maintaining said element in either of said positions.

17. In a brake control system, a source of fluid pressure supply, a plurality of rotatable members, each member being provided with braking means, and selective means including a plurality of separate valves operable independently or in combination for controlling said fluid pressure to respectively actuate said braking means independently or in combination.

18. In a brake control system, a source of fluid pressure supply, a plurality of rotatable members, each member being provided with braking means, and selective means including a plurality of separate valves operable independently or in combination for controlling said fluid pressure to respectively actuate said braking means independently or in combination into operative or inoperative position and to maintain the same in either of said actuated positions.

19. In a brake control system, a source of fluid pressure supply, a plurality of rotatable members, each member being provided with braking means, and selective means including a plurality of separate valves operable independently or in combination for controlling said fluid pressure to respectively actuate said braking means independently or in combination into operative or inoperative position.

20. In a brake control system, a source of fluid pressure supply, a plurality of rotatable members, a pressure responsive brake element for each member, means for selectively controlling the transmission of said fluid pressure to actuate any one of said pressure responsive elements into brake applying position and for maintaining said element in applied position.

ERNEST G. McCAULEY.